United States Patent
Cho

(10) Patent No.: US 7,250,982 B2
(45) Date of Patent: Jul. 31, 2007

(54) DEVICE AND METHOD FOR PROCESSING PIP IN TV

(75) Inventor: Han Kyoung Cho, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 09/989,462

(22) Filed: Nov. 21, 2001

(65) Prior Publication Data

US 2002/0063800 A1 May 30, 2002

(30) Foreign Application Priority Data

Nov. 24, 2000 (KR) ............................. 2000-70328

(51) Int. Cl.
*H04N 5/45* (2006.01)

(52) U.S. Cl. ............... 348/565; 348/563; 348/564; 348/569; 348/584

(58) Field of Classification Search ........... 348/565, 348/563, 564, 566, 569, 578, 577, 582, 586, 348/597, 598, 599, 668, 584; 725/37; *H04N 5/45*
See application file for complete search history.

(56) References Cited

U.S. PATENT DOCUMENTS

| | | | | |
|---|---|---|---|---|
| 5,175,623 A | * | 12/1992 | Jenison | 348/598 |
| 5,625,764 A | * | 4/1997 | Tsujimoto et al. | 345/640 |
| 5,969,767 A | * | 10/1999 | Ishikawa et al. | 348/564 |
| 5,978,046 A | * | 11/1999 | Shintani | 348/589 |
| 6,333,762 B1 | * | 12/2001 | Yoo et al. | 348/441 |
| 6,359,657 B1 | * | 3/2002 | Westerink et al. | 348/584 |
| 6,373,527 B1 | * | 4/2002 | Lee | 348/564 |
| 6,473,130 B1 | * | 10/2002 | Kim | 348/565 |
| 6,552,750 B1 | * | 4/2003 | Suen et al. | 348/561 |
| 2002/0069411 A1 | * | 6/2002 | Rainville et al. | 725/37 |

FOREIGN PATENT DOCUMENTS

JP 10-042218 2/1998

(Continued)

OTHER PUBLICATIONS

Japanese Office Action dated Feb. 8, 2005.

*Primary Examiner*—Trang Tran
(74) *Attorney, Agent, or Firm*—Ked & Associates, LLP

(57) ABSTRACT

A device and method for processing a PIP (picture in picture) in a TV, in which a PIP is overlaid on a main picture, thus allowing a user to watch the PIP as well as the main picture even in a region of the PIP at the same time. The device includes a first video processing part for receiving, and processing a main picture video signal into a signal displayable on a screen, a second video processing part for receiving, and processing a sub picture video signal into a signal displayable on a region of the screen, a control part for providing a control signal according to a users command, and an adjusting part for adjusting a presenting ratio of a video signal from the second video processing part for adjusting a presenting ratio of a video signal from the second video processing part in response to the control signal from the control part, thereby permitting a user to watch the main picture even in the sub picture because a mix ratio adjustment of the main picture and the sub picture are possible, and to watch a good quality main, and sub pictures because the mix ratio of the main picture and the sub picture can be adjusted appropriately.

16 Claims, 3 Drawing Sheets

FOREIGN PATENT DOCUMENTS

| | | |
|---|---|---|
| JP | 10-042218 A | 2/1998 |
| JP | 10-503626 A | 3/1998 |
| JP | 2000-270293 | 9/2000 |
| JP | 2000-270293 A | 9/2000 |
| WO | WO 00/27112 | 5/2000 |

* cited by examiner

DEVICE AND METHOD FOR PROCESSING PIP IN TV

This application claims the benefit of the Korean Application No. P2000-70328 filed on Nov. 24, 2000, which is hereby incorporated by reference.

BACKGROUND OF THE INVENTION

1. Field of the Invention

The present invention relates to a TV, and more particularly, to a device and method for processing a PIP (picture in picture) in a TV, in which a PIP is overlaid on a main picture, to permit watching the PIP as well as the main picture even in a region of the PIP on the same time.

2. Background of the Related Art

In general, the PIP is a picture compressed in vertical and horizontal directions to form a sub-picture, and displayed in a main picture, which may, or may not be on the same channel with the sub-picture.

A related art device for processing a PIP in a TV will be explained, with reference to the attached drawings. FIG. 1 illustrates a block diagram of a related art device for processing a PIP in a TV.

Referring to FIG. 1, the related art device for processing a PIP in a TV is provided with a first video decoder 1 for receiving, and decoding a main picture video signal, a second video decoder 2 for receiving, and decoding a sub-picture video signal, a memory 3 for storing the video signal decoded at the second video decoder 2, and a digital/analog converter 4 for converting a digital video signal either from the first video decoder 1 or the memory 3 into an analog video signal.

When a user selects a PIP menu in the middle of display of the main picture video signal decoded at the first video decoder 1, the sub-picture video signal decoded at the second video decoder 2 is drawn from the memory 3, and displayed on a region of the main picture from the first video decoder 1, with the sub-picture being overlapped on the main picture. Accordingly, the main picture is not displayed in the region the sub-picture is displayed.

Thus, the related art device for processing a PIP in a TV has a problem in that no main picture is displayed in a region the sub-picture is displayed, unable to watch the main picture in the region once the PIP function is selected.

SUMMARY OF THE INVENTION

Accordingly, the present invention is directed to device and method for processing a PIP (picture in picture) in a TV that substantially obviates one or more of the problems due to limitations and disadvantages of the related art.

An object of the present invention is to provide device and method for processing a PIP in a TV, in which a PIP is overlaid on a main picture, to permit watching the PIP as well as the main picture even in a region of the PIP on the same time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for processing a PIP in a TV includes a first video processing part for receiving, and processing a main picture video signal into a signal displayable on a screen, a second video processing part for receiving, and processing a sub picture video signal into a signal displayable on a region of the screen, a control part for providing a control signal according to a users command, and an adjusting part for adjusting a presenting ratio of a video signal from the second video processing part in response to the control signal from the control part.

In another aspect of the present invention, there is provided a method for processing a PIP in a TV, including the steps of displaying the PIP when a user selects a PIP function, displaying a mix ratio of the displayed PIP and main picture, and adjusting the mix ratio the user desires with reference to the displayed mix ratio.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
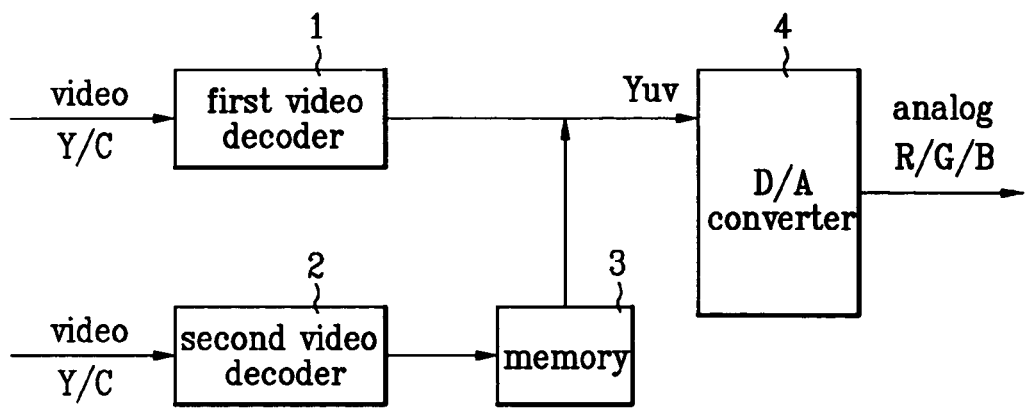
FIG. 1 illustrates a block diagram of a related art device for processing a PIP in a TV.
Figure 2:
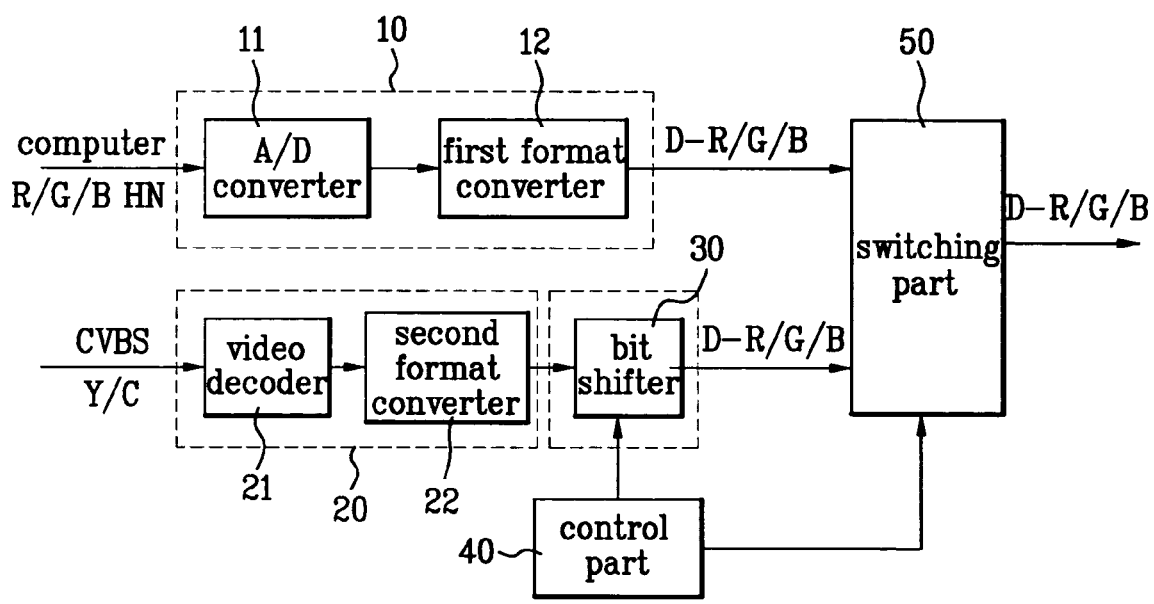
FIG. 2 illustrates a block diagram of a device for processing a PIP in a TV in accordance with a preferred embodiment of the present invention.
Figure 3:
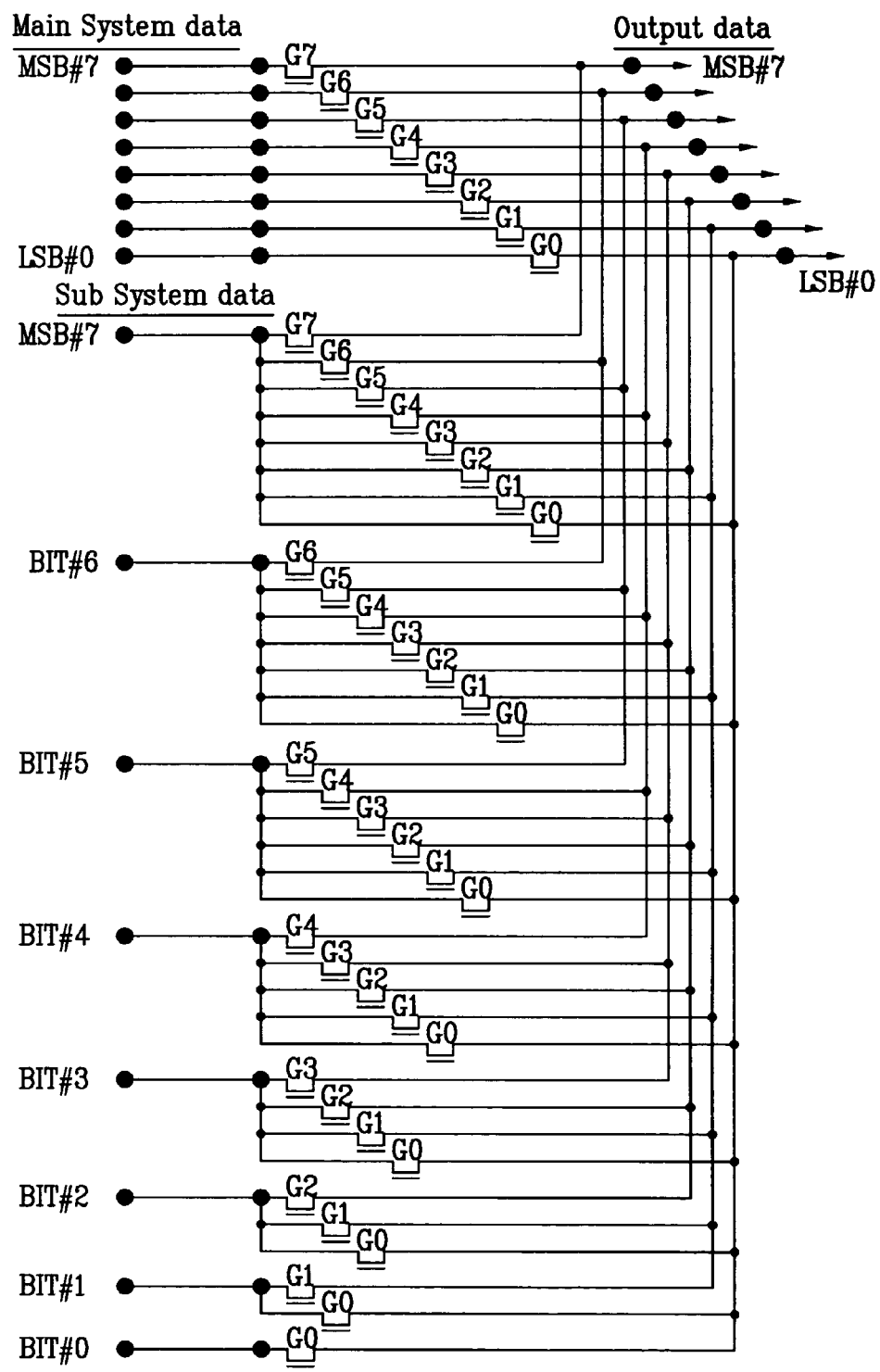
FIG. 3 illustrates relations of signals from the first format converter and the bit shifter in FIG. 2; and, FIG. 4 illustrates a flow chart showing the steps of a method for processing a PIP in a TV in accordance with a preferred embodiment of the present invention.
Figure 4:
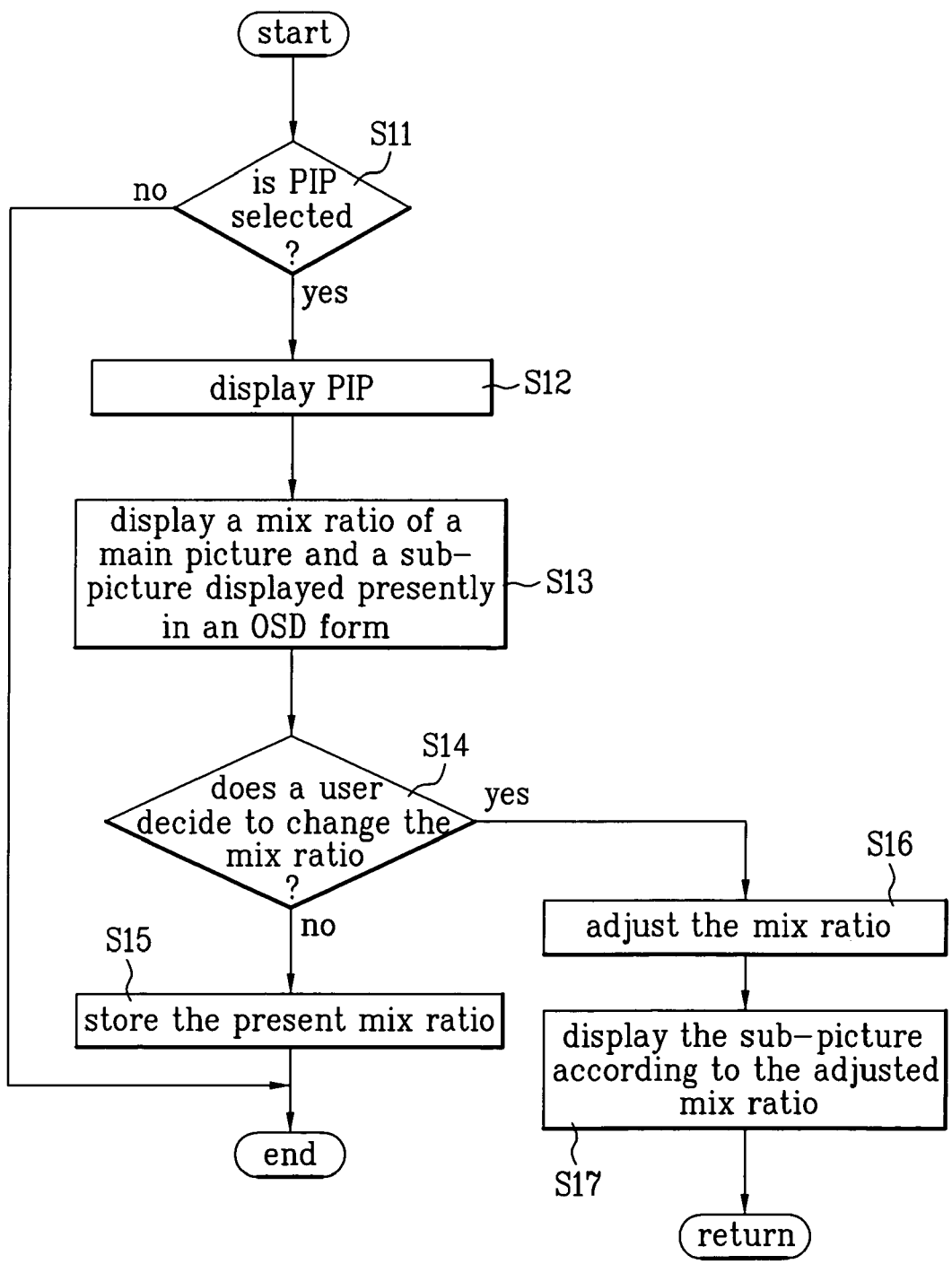

Reference will now be made in detail to the preferred embodiments of the present invention, examples of which are illustrated in the accompanying drawings. FIG. 2 illustrates a block diagram of a device for processing a PIP in a TV in accordance with a preferred embodiment of the present invention, FIG. 3 illustrates relations of signals from the first format converter and the bit shifter in FIG. 2, and FIG. 4 illustrates a flow chart showing the steps of a method for processing a PIP in a TV in accordance with a preferred embodiment of the present invention.

Referring to FIG. 2, the device for processing a PIP in a TV in accordance with a preferred embodiment of the present invention includes a first video processing part 10 for receiving, and processing a main picture video signal into a signal displayable on a screen, a second video processing part 20 for receiving, and processing a sub picture video signal into a signal displayable on a region of the screen, a control part 40 for providing a control signal according to a users command, an adjusting part 30 for adjusting a presenting ratio of a video signal from the second video processing part 20 in response to the control signal from the control part 40, a switching part 50 for superimposing the video signal from the first video processing part 10 and the video signal from the adjusting part 30 selectively according to the control signal from the control part 40.

The first video processing part 10 includes an analog/digital converter 11 for converting the analog R, G, B video signals to the digital R, G, B video signals, and a first format converter 12 for maintaining outputs of the digital R, G, B signals from the analog/digital converter 11 constant.

The second video processing part 20 includes a video decoder 21 for receiving a superimposed video signal, and decoding a video signal from the superimposed video signal, a second format converter 22 for converting a format of an output signal of the video decoder 22 into a desired format.

The adjusting part 30 is a bit sifter for controlling a signal converted at the second format converter 22 to be presented starting from a most significant bit thereof in response to a control signal from the control part 40.

The operation of the device for processing a PIP in a TV in accordance with a preferred embodiment of the present invention will be explained.

At first, upon reception of analog R, G, B video signals from a PC at the A/D converter 11, the analog A, G, B video signals are converted into digital R, G, B signals, provided to the first format converter 12, and converted into a signal of a fixed format regardless of received signals.

The video decoder 21 receives a superimposed video signal through an antenna, decodes, and provides a video signal to the second format converter 22, which video signal is converted into a required format, provided to the bit shifter 30, and presented starting from the MSB (Most Significant Bit) according to an amount of bits the user intends to select.

The digital R, G, B video signals from the first format converter 12 and the bit shifter 30 are provided the switching part 50, and superimposed selectively according to a control signal from the control part 40. That is, the R, G, B video signals from the first format converter 12 according to the control signal from the control part 40 are superimposed on the R, G, B video signals from the second video processing part 20, a ratio of bit superimposition of the main picture, and the sub-picture video data can be adjusted.

Referring to FIG. 3, different from the main picture, the sub-picture data have an output dataline connected to each bit for superimposing on the main picture with reference to the MSB. Accordingly, the superimposition of the main data and the sub data starts from the LSB (Least Significant Bit) on a main dataline according to a ratio of mix with reference to the MSB, and if the ratio of mix is increased, an amount of superimposition of the sub data can be varied.

That is, if only the MSE from the bit shifter 30 is presented, the MSB is added to the LSB of the main data from the first format converter 12 before the presentation. In this instance, the sub picture signal, i.e., the MSB from the bit shifter 30 is transmitted trough the LSB line of the main picture.

A method for processing a PIP in a TV in accordance with a preferred embodiment of the present invention will be explained, with reference to FIG. 4.

At first, users selection of the PIP function is determined (S11). Then, as a result of the determination (S11), if the user selects the PIP function, a PIP is displayed, and the present mix ratio of the PIP and the main picture is displayed in an On Screen Display (OSD) form (S12). If the user intends to change the mix ratio with reference to the OSD form of mix ratio, the mix ratio may be adjusted to a desired mix ratio (S13). On the other hand, if the user intends to watch both pictures as they are, the present mix ratio is stored (S14).

Thus, when the user intends to watch the main picture and the sub picture on the same time even in a region of the sub picture, the device and method for processing a PIP in a TV of the present invention permits to watch the main picture even in a region the PIP is displayed by automatically adjusting a mix ratio of the region the main picture and the sub picture are to be superposed, superimposing the pictures according to the users intention.

As has been explained, the device and method for processing a PIP in a TV of the present invention have the following advantages.

First, the possibility of mix ratio adjustment of the main picture and the sub picture permits to watch the main picture even in the sub picture.

Second, the appropriate adjustment of the Fix ratio of the main picture and the sub picture permits to watch a good quality main, and sub pictures.

It will be apparent to those skilled in the art various modifications and variations can be made in the device and method for processing a PIP in a TV of the present invention without departing from the spirit or scope of the invention. Thus, it is intended that the present invention cover the modifications and variations of this invention provided they come within the scope of the appended claims and their equivalents.

What is claimed is:

1. A device for processing a PIP (picture in picture) in a TV comprising:
    a first video processing part for receiving, and processing a main picture video signal into a signal displayable on a screen;
    a second video processing part for receiving, and processing a sub picture video signal into a signal displayable on a region of the screen;
    a control part for providing a control signal according to a user's command;
    an adjusting part for adjusting a presenting ratio of a video signal from the second video processing part, wherein a given number of bits of the video signal from the second video processing part are selected and presented in order of significance level thereof; and
    a switching part for superimposing the video signal from the first video processing part and the video signal from the adjusting part according to the control signal from the control part, by adding bits of the video signal from the first video processing part in reverse order of significance level thereof with the video signal bits presented from the adjusting part.

2. A device as claimed in claim 1, wherein the first video processing part includes:
    an analog/digital converter for receiving, and converting analog R, G, B video signals into digital R, G, B video signals, and
    a format converter for maintaining outputs of the digital R, G, B video signals converted at the analog/digital converter constant.

3. A device as claimed in claim 1, wherein the second video processing part includes:
    a video decoder for receiving a video signal, and decoding the sub picture video signal from the video signal, and
    a second format converter for converting an output of the video signal decoded at the video decoder constant.

4. A device as claimed in claim 1, wherein the adjusting part is a bit shifter.

5. A method for processing a PIP (picture in picture) in a TV, comprising:
    displaying the PIP when a user selects a PIP function;
    displaying a mix ratio of the displayed PIP and main picture;

adjusting the mix ratio the user desires with reference to the displayed mix ratio; and adding bits of a video signal of the main picture in reverse order of significance level thereof with bits of a video signal of the PIP selected and presented in order of significance level thereof according to the adjusted mix ratio.

6. A method as claimed in claim 5, wherein displaying the mix ratio includes displaying the mix ratio in a form of an OSD (On Screen Display).

7. A method as claimed in claim 5, wherein adjusting the mix ratio includes adjusting a luminance of a PIP according to a user's requirement with reference to the mix ratio displayed in an OSD (On Screen Display) form, for adjusting the mix ratio of a picture in a region the main picture and the sub picture are superimposed.

8. A method as claimed in claim 5, wherein adjusting the mix ratio includes fixing the mix ratio depending on connections between a video signal data from a first video processing part and a video signal from a second video processing part according to a user's requirement.

9. A method for processing a PIP (picture in picture) in a digital television receiver, the method comprising:

processing a first video signal representative of a main picture into main picture data displayable on a display screen;

processing a second video signal representative of a sub picture into sub picture data displayable on a portion of the display screen;

outputting a given number of data bits among the sub picture data according to a user command in order of significance level thereof; and superimposing the outputted sub picture data bits on the main picture data, wherein the outputted sub picture data bits are added to bits of the main picture data in reverse order of significance of the main picture data bits during the superimposing.

10. The method of claim 9, further comprising displaying the added main picture data on the display screen, wherein both of the main and sub pictures are viewable in the portion of the display screen.

11. The method of claim 9, wherein processing the first video signal representative of a main picture includes:

receiving analog R, G, and B video signals representative of the main picture and converting the analog R, G, and B video signals into digital R, G, and B video signals; and converting a format of the converted digital R, G, and B video signals into a required format.

12. The method of claim 9, wherein processing the second video signal representative of a sub picture includes:

receiving a composite video signal and extracting a video signal representative of the sub picture from the composite signal; and converting a format of the extracted video signal into a required format.

13. A digital television system comprising:

a first video processing unit processing a first video signal representative of a main picture into displayable main picture data;

a second video processing unit processing a second video signal representative of a sub picture into displayable sub picture data;

a controller generating a control signal according to a user command;

an output unit coupled to the controller for outputting a given number of data bits among the sub picture data in order of significance level thereof in response to the control signal; and a switching unit coupled to the output unit for superimposing the outputted sub picture data bits on the main picture data, wherein the switching unit superimposes the outputted sub picture data bits on the main picture data by adding the outputted sub picture data bits with bits of the main picture data in reverse order of significance of the main picture data bits.

14. The digital television system of claim 13, further comprising a display screen coupled to the switching unit for displaying the superimposed picture data, wherein both of the main and sub pictures are viewable in a portion of the display screen.

15. The digital television system of claim 13, wherein the first video processing unit comprises:

an analog to digital (AD) converter converting analog R, G, and B video signals representative of the main picture into digital R, G, and B video signals; and a format converter coupled to the AD converter for converting a format of the digital R, G, and B video signals into a required format.

16. The digital television system of claim 13, wherein the second video processing unit comprises:

a video decoder receiving a composite video signal and extracting the second video signal from the composite video signal; and a format converter converting a format of the extracted video signal into a required format.

* * * * *